United States Patent
Kraipak et al.

(10) Patent No.: US 8,407,332 B1
(45) Date of Patent: Mar. 26, 2013

(54) SYSTEM AND METHOD FOR IN-NETWORK POWER MANAGEMENT

(75) Inventors: Waseem Saify Kraipak, Maharashtra (IN); Rajeev Ganesh, Tamil Nadu (IN)

(73) Assignee: Applied Micro Circuits Corporations, San Diego, CA (US)

( * ) Notice: Subject to any disclaimer, the term of this patent is extended or adjusted under 35 U.S.C. 154(b) by 335 days.

(21) Appl. No.: 12/848,066

(22) Filed: Jul. 30, 2010

Related U.S. Application Data

(63) Continuation-in-part of application No. 12/828,872, filed on Jul. 1, 2010.

(51) Int. Cl.
*G06F 11/30* (2006.01)

(52) U.S. Cl. .......................... 709/223; 709/224; 713/320

(58) Field of Classification Search .................. 709/223, 709/224; 713/320–324
See application file for complete search history.

(56) References Cited

U.S. PATENT DOCUMENTS

| | | | | |
|---|---|---|---|---|
| 6,795,450 B1 * | 9/2004 | Mills et al. | | 370/463 |
| 7,317,732 B2 * | 1/2008 | Mills et al. | | 370/445 |
| 7,327,754 B2 * | 2/2008 | Mills et al. | | 370/463 |
| 7,398,408 B2 * | 7/2008 | Paljug | | 713/323 |
| 8,156,360 B2 * | 4/2012 | Paljug | | 713/323 |
| 2006/0112287 A1 * | 5/2006 | Paljug | | 713/300 |
| 2008/0313481 A1 * | 12/2008 | Paljug | | 713/323 |
| 2010/0306566 A1 * | 12/2010 | Dehaan et al. | | 713/330 |
| 2012/0131369 A1 * | 5/2012 | Paljug | | 713/323 |

* cited by examiner

*Primary Examiner* — Kenneth R Coulter

(57) ABSTRACT

A system and method are provided for in-network power management of network-connected devices. A first computing device, having a power management module, is able to access an in-network computing device table stored in a local memory, of network-connected computing devices cross-referenced to computing device processing capabilities. The power management module retrieves processing capabilities from the in-network computing device table for a network-connected second computing device, and sends a Wake-on-Local Area Network (LAN) message to the second computing device. Subsequently, the power management module sends a server-on-cloud power management message (power management packet) to the second computing device, with instructions for enabling capabilities related to processing or memory management.

24 Claims, 8 Drawing Sheets

MAC Address:

00 E0 4C 31 03 AC

Password:

00 00 00 00 00 00

Raw Data (108 bytes):

| FF FF FF FF FF FF | 00 E0 4C 31 03 AC | 00 E0 4C |
| 31 03 AC | 00 E0 4C 31 03 AC | 00 E0 4C 31 03 AC |
| 00 E0 4C 31 03 AC | 00 E0 4C 31 03 AC | 00 E0 4C |
| 31 03 AC | 00 E0 4C 31 03 AC | 00 E0 4C 31 03 AC | 00 |
| E0 4C 31 03 AC | 00 E0 4C 31 03 AC | 00 E0 4C 31 |
| 03 AC | 00 E0 4C 31 03 AC | 00 E0 4C 31 03 AC | 00 |
| E0 4C 31 03 AC | 00 E0 4C 31 03 AC | 00 00 00 00 |
| 00 00 |

| MAC Header | Processor BCT | P7 | P6 | P5 | P4 | P3 | P2 | P1 | P0 | Processor Parameter | Core BCT | C7 | C6 | C5 | C4 | C3 | C2 | C1 | C0 | CORE PARAMETER | REMARKS |
|---|---|---|---|---|---|---|---|---|---|---|---|---|---|---|---|---|---|---|---|---|---|
| CODE | 0xFF | x | x | x | x | x | x | x | x | VID VOLTAGE FREQ VALUE | NA | NA | NA | NA | NA | NA | NA | NA | NA | NA | Processor BCT = F All processors powered up at VID VOLTAGE FREQ Value. |
| CODE | 0x00 | 0 | 0 | 0 | 0 | 0 | 0 | 0 | 1 | x | 0xFF | x | x | x | x | x | x | x | x | VID VOLTAGE FREQ VALUE | Processor "0" Power up. Core BCT = FF All cores powered up with CORE Parameter |
| CODE | 0x00 | 0 | 0 | 0 | 0 | 0 | 0 | 1 | 0 | x | 0xFF | x | x | x | x | x | x | x | x | VID VOLTAGE FREQ VALUE | Processor "1" Power up. Core BCT = FF All cores powered up with CORE Parameter |
| CODE | 0x00 | 0 | 0 | 0 | 0 | 0 | 1 | 0 | 0 | x | 0xFF | x | x | x | x | x | x | x | x | VID VOLTAGE FREQ VALUE | Processor "2" Power up. Core BCT = FF All cores powered up with CORE Parameter |
| CODE | 0x00 | 0 | 0 | 0 | 0 | 1 | 0 | 0 | 0 | x | 0xFF | x | x | x | x | x | x | x | x | VID VOLTAGE FREQ VALUE | Processor "3" Power up. Core BCT = FF All cores powered up with CORE Parameter |
| CODE | 0x00 | 0 | 0 | 0 | 1 | 0 | 0 | 0 | 0 | x | 0xFF | x | x | x | x | x | x | x | x | VID VOLTAGE FREQ VALUE | Processor "4" Power up. Core BCT = FF All cores powered up with CORE Parameter |
| CODE | 0x00 | 0 | 0 | 1 | 0 | 0 | 0 | 0 | 0 | x | 0xFF | x | x | x | x | x | x | x | x | VID VOLTAGE FREQ VALUE | Processor "5" Power up. Core BCT = FF All cores powered up with CORE Parameter |
| CODE | 0x00 | 0 | 1 | 0 | 0 | 0 | 0 | 0 | 0 | x | 0xFF | x | x | x | x | x | x | x | x | VID VOLTAGE FREQ VALUE | Processor "6" Power up. Core BCT = FF All cores powered up with CORE Parameter |
| CODE | 0x00 | 1 | 0 | 0 | 0 | 0 | 0 | 0 | 0 | x | 0xFF | x | x | x | x | x | x | x | x | VID VOLTAGE FREQ VALUE | Processor "7" Power up. Core BCT = FF All cores powered up with CORE Parameter |
| CODE | 0x00 | 0 | 0 | 0 | 0 | 0 | 0 | 0 | 1 | x | 0x00 | 0 | 0 | 0 | 0 | 0 | 0 | 0 | 1 | VID VOLTAGE FREQ VALUE | Processor "0" Power up. Core0 selected and programmed with Core Parameter |
| CODE | 0x00 | 0 | 0 | 0 | 0 | 0 | 0 | 1 | 0 | x | 0x00 | 0 | 0 | 0 | 0 | 0 | 0 | 1 | 0 | VID VOLTAGE FREQ VALUE | Processor "1" Power up. Core1 selected and programmed with Core Parameter |
| CODE | 0x00 | 0 | 0 | 0 | 0 | 1 | 1 | 0 | 0 | x | 0x00 | 0 | 0 | 0 | 0 | 1 | 1 | 0 | 0 | VID VOLTAGE FREQ VALUE | Processor "2" Power up. Cores 2 and 3 selected and programmed with Core Parameter |
| CODE | 0x00 | 0 | 0 | 0 | 0 | 1 | 0 | 1 | 0 | x | 0x00 | 0 | 0 | 0 | 0 | 1 | 0 | 1 | 0 | VID VOLTAGE FREQ VALUE | Processors "1" and "3" selected. Cores "8" and "11" selected and programmed with Core Parameter |
| CODE | 0xFF | 0 | 0 | 0 | 0 | 1 | 1 | 1 | 1 | x | 0x00 | 0 | 0 | 0 | 1 | 0 | 0 | 0 | 0 | VID VOLTAGE FREQ VALUE | Processor "23" selected. Core4 selected and programmed with Core Parameter |
| CODE | 0x00 | 0 | 0 | 1 | 0 | 0 | 0 | 0 | 0 | x | 0x00 | 0 | 0 | 1 | 0 | 0 | 0 | 0 | 0 | VID VOLTAGE FREQ VALUE | Processor "1" selected. Core5 selected and programmed with Core Parameter |
| CODE | 0x00 | 0 | 1 | 0 | 0 | 0 | 0 | 0 | 0 | x | 0x00 | 0 | 1 | 0 | 0 | 0 | 0 | 0 | 0 | VID VOLTAGE FREQ VALUE | Processor "1" selected. Core6 selected and programmed with Core Parameter |
| CODE | 0x00 | 1 | 0 | 0 | 0 | 0 | 0 | 0 | 0 | x | 0x00 | 1 | 0 | 0 | 0 | 0 | 0 | 0 | 0 | VID VOLTAGE FREQ VALUE | Processor "1" selected. Core7 selected and programmed with Core Parameter |

BCT Field Usage
0xFF == Broadcast
0x00 == One hot (bitmap)
0x01 == One hot (shift 1 byte)
0x02 == One hot (shift 2 byte)
0x03 == One hot (shift 3 byte)
0x04 == One hot (shift 4 byte)
0x05 == One hot (shift 5 byte)
and so on until 0x20 (shift 32)
0xFE == Binary value (0-255)

Notes
Selects any combination of 1st group of eight processors or cores
Selects any combination of 2nd group of eight processors or cores
Selects any combination of 3rd group of eight processors or cores
Selects any combination of 4th group of eight processors or cores
Selects any combination of 5th group of eight processors or cores
Selects any combination of 6th group of eight processors or cores Selects any one of 256 processors or cores

FIG. 4

SYSTEM AND METHOD FOR IN-NETWORK POWER MANAGEMENT

RELATED APPLICATIONS

This application is a Continuation-in-Part of a patent application entitled, SYSTEM AND METHOD FOR INVENTORYING IN-NETWORK PROCESSING CAPABILITY, invented by Waseem Kraipak et al, Ser. No. 12/828,872, filed Jul. 1, 2010, which is incorporated herein by reference.

BACKGROUND OF THE INVENTION

1. Field of the Invention

This invention generally relates to in-network processor management and, more particularly, to a system and method for using an L2 layer protocol to manage the processor and memory capabilities of in-network computer devices.

2. Description of the Related Art

In computer networking, the Link Layer is the lowest layer in the Internet Protocol Suite, the networking architecture of the Internet (RFC 1122, RFC 1123). It is the group of methods or protocols that only operate on a host's link. The link is the physical and logical network components used to interconnect hosts or nodes in the network and a link protocol is a suite of methods and standards that operate only between adjacent network nodes of a Local Area Network (LAN) segment or a Wide Area Network (WAN) connection.

Despite the different semantics of layering in TCP/IP and OSI, the Link Layer is often described as a combination of the Data Link Layer (Layer 2) and the Physical Layer (Layer 1) in the Open Systems Interconnection (OSI) protocol stack. LAN standards such as Ethernet and IEEE 802 specifications use terminology from the seven-layer OSI model rather than the TCP/IP reference model. The TCP/IP model in general does not consider physical specifications, rather it assume a working network infrastructure that can deliver media level frames on the link. Therefore RFC 1122 and RFC 1123, the definition of the TCP/IP model, do not discuss hardware issues and physical data transmission and set no standards for those aspects, other than broadly including them as Link Layer components. Some practitioners assume that physical data transmission aspects are part of the Link Layer. Other practitioners assume a hardware layer or physical layer below the link layer, and several of them adopt the OSI term Data Link Layer instead of Link Layer in a modified description of layering.

The Link Layer Discovery Protocol (LLDP) is an agnostic Data Link Layer protocol used by network devices for advertising of their identity, capabilities, and interconnections on an IEEE 802 LAN network. The protocol is formally referred to by the IEEE as Station and Media Access Control Connectivity Discovery specified in standards document 802.1AB. Information gathered with LLDP is stored in the device as a management information database (MIB) and can be queried with, the Simple Network Management Protocol (SNMP) as specified in RFC 2922. The topology of an LLDP-enabled network can be discovered by crawling the hosts and querying this database. The information that may be retrieved include: System name and description; Port name and description; VLAN name; IP management address; switching and routing capabilities; and MAC/PHY information.

LLDP frames are sent by each device, on each port, at a fixed frequency. A frame contains a Link Layer Discovery Protocol Data Unit (LLDPDU) which is a set of type-length-value (TLV) structures. This LLDPDU is enclosed into an Ethernet frame in which the destination MAC address is set to a multicast address. The Link Layer Discovery Protocol may be used as a component in network management and monitoring applications.

The WOL (Wake-on-LAN) Magic packet is used to remotely wake up a computing device from a sleep/deep sleep mode. It may also be known as Remote Wake-Up or RWU. When received, the WOL packet wakes a computer device system such that all the processors/cores are working at maximum configuration (maximum frequency and corresponding maximum operating voltages). In a multi-processor/core system, the protocol cannot specify that only a particular processor/core be awakened, or order any wake-up configuration other than maximum frequency and its corresponding operating voltage for the core. If the computer being awakened is communicating via Wi-Fi, the wake-up-packet can be sent via Wireless Multimedia Extensions (WMM). This packet may also be called Wake on Wireless LAN (WoWLAN).

Wake-on-LAN support is implemented on the motherboard of a computer and the network interface, and is not dependent on the operating system running on the hardware, although the operating system can sometimes control the Wake-on-LAN behavior. If the network interface is a plug-in card rather than being integrated into the motherboard, the card may need to be connected to the motherboard by a cable. Wake-on-LAN is platform-independent, so any application on any platform that sends magic packets can wake up computers running on any platform. It is not restricted to LAN (Local area network) traffic.

The computer to be woken may be shut down (sleeping; i.e. ACPI state G1 or G2), with power reserved for the network card, but not disconnected from its power source. The network card "listens" for a specific packet containing its MAC address, called the magic packet, broadcast on the broadcast address for that particular subnet (or an entire LAN, though this requires special hardware or configuration).

The magic packet is sent on the data link or Layer 2 in the OSI model and broadcast to all network interface cards (NICs) within the network of the broadcast address; the IP-address (layer 3 in the OSI model) is not used. When the listening computer receives this packet, the network card checks the packet for the correct information. If the magic packet is valid, the network card takes the computer out of hibernation or standby, and starts it up. In order for Wake-on-LAN to work, parts of the network interface need to stay on. This consumes standby power, but standby power is less than the computer's normal operating power.

FIG. 1 is a diagram depicting an exemplary WOL packet (prior art). The WOL magic packet is a broadcast frame containing anywhere within its payload: 6 bytes of ones (resulting in hexadecimal FF FF FF FF FF FF), followed by sixteen repetitions of the target computer's MAC address. There are three different ways to send Wake-on-LAN packets:

1. Limited broadcast. The Magic Packet is sent to the limited broadcast address (255.255.255.255). It is received by all machines on the same subnet but not forwarded to machines on other subnets.

2. Subnet-directed broadcast. The packet is sent to the target machine subnet. The router or switch forwards the packet to all ports containing machines on the subnet.

3. Unicast. The packet is sent directly to the machine IP address. If the router or switch still has cached the port to which that computer is attached, the packet gets access to the machine Since the magic packet is only scanned for the string as shown, and not actually parsed by a full protocol stack, it may be sent as a broadcast packet of any network- and transportlayer protocol. It is typically sent as a user datagram protocol (UDP) datagram to port 0, 7, or 9, or, in former times, as an internetwork packet exchange (IPX) packet.

It would be advantageous if the function of the WOL packet could be extended to finely control the manner in which a computer device is awoken from a deep sleep.

It would be advantageous if an extended function WOL packet could be used to remotely enable or disable specific processors or processors cores in a computing device.

SUMMARY OF THE INVENTION

Disclosed herein is a power management packet, which is sent subsequent to a Wake-on-LAN (WOL) packet, with instructions concerning the processors/cores in a computing device that are to be awoken and their specific configuration parameters. This packet can be sent even if the system is already awake, to modify the power consumption parameters or performance parameters of the system. For example, the packet can be used to add cores, change frequencies/voltages, or add processors. The power management packet is especially useful in managing multiprocessor or multi-core systems such as servers, supercomputers, or massively parallel computers. Since the packet is a Layer-2 communication, it is agnostic to the number or type of processors or cores.

Power is the major factor in the design and operation of multiprocessor computers. The conventional WOL packet wakes up all the processors/cores in a device, without regard to the number of processors/cores needed to perform an incoming application. This methodology typically consumes more power than is needed. By sending the disclosed power management packet subsequent to the WOL packet, particular processors/cores can be awoken, and explicit operating parameters (e.g., frequency and operating voltage) selected. Substantial power savings are realized by running applications at only the sufficient computing bandwidth. This protocol is backwards compatible, as the packet is dropped by machines unable to parse the disclosed power management packet.

The power management packet is supported by an underlying mechanism that permits any computing device to collect information on the processing resources of other network-connected devices. The information provided by such a resource may concern hardware configuration and loading details; such as type and speed-grade of processors, the number of processors, the number of cores associated with each processor, the type, speed-grade, and amount of installed memory, free memory, CPU loading, the number of co-processors or add-in boards that are installed (e.g., graphics accelerators and digital signal processors (DSPs)), and thermal status information. To support the above-described functions, a "sniff" protocol for intelligent cloud computing may be issued at the L2 layer, at periodic intervals.

Since a system is aware of the capabilities and configurations of the machines in the network, the priority of a job can be compared to power consumption, and the job sent to the most appropriate machine. Alternately, the processing capabilities of the machine may be adjusted for maximum efficiency using the power management packet, prior to sending the job.

Accordingly, a method is provided for in-network power management of network-connected devices. A first computing device, having a power management module, is able to access an in-network computing device table stored in a local memory, of network-connected computing devices cross-referenced to computing device processing capabilities. The power management module retrieves processing capabilities from the in-network computing device table for a network-connected second computing device, and sends a Wake-on-Local Area Network (LAN) message to the second computing device. Subsequently, the power management module sends a server-on-cloud power management message (power management packet) to the second computing device, with instructions for enabling capabilities related to processing or memory management.

In one aspect, the power management module accesses the in-network computing device table in response to the first computing device receiving a request to perform a task, and retrieves second computing device capabilities in response to matching the task to the second computing device capabilities. Then, the server-on-cloud power management message includes instructions for enabling capabilities associated with performing the task. Subsequent to sending the server-on-cloud power management message, the power management module sends the task to the second computing device for performance.

Additional details of the above-described method, and a system for the in-network power management of network-connected devices, are provided below.

BRIEF DESCRIPTION OF THE DRAWINGS

FIG. 4 is a table with the bit definition of the SoC-PM message packet of FIG. 3.

DETAILED DESCRIPTION

As used in this application, the terms "component," "module," "system," and the like may be intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The computer devices described below typically employ a computer system with a bus or other communication mechanism for communicating information, and a processor coupled to the bus for processing information. The computer system may also includes a main memory, such as a random access memory (RAM) or other dynamic storage device, coupled to the bus for storing information and instructions to be executed by processor. These memories may also be referred to as a computer-readable medium. The execution of the sequences of instructions contained in a computer-readable medium may cause a processor to perform some of the steps associated with position calculation. Alternately, these functions, or some of these functions may be performed in hardware. The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Figure 2:
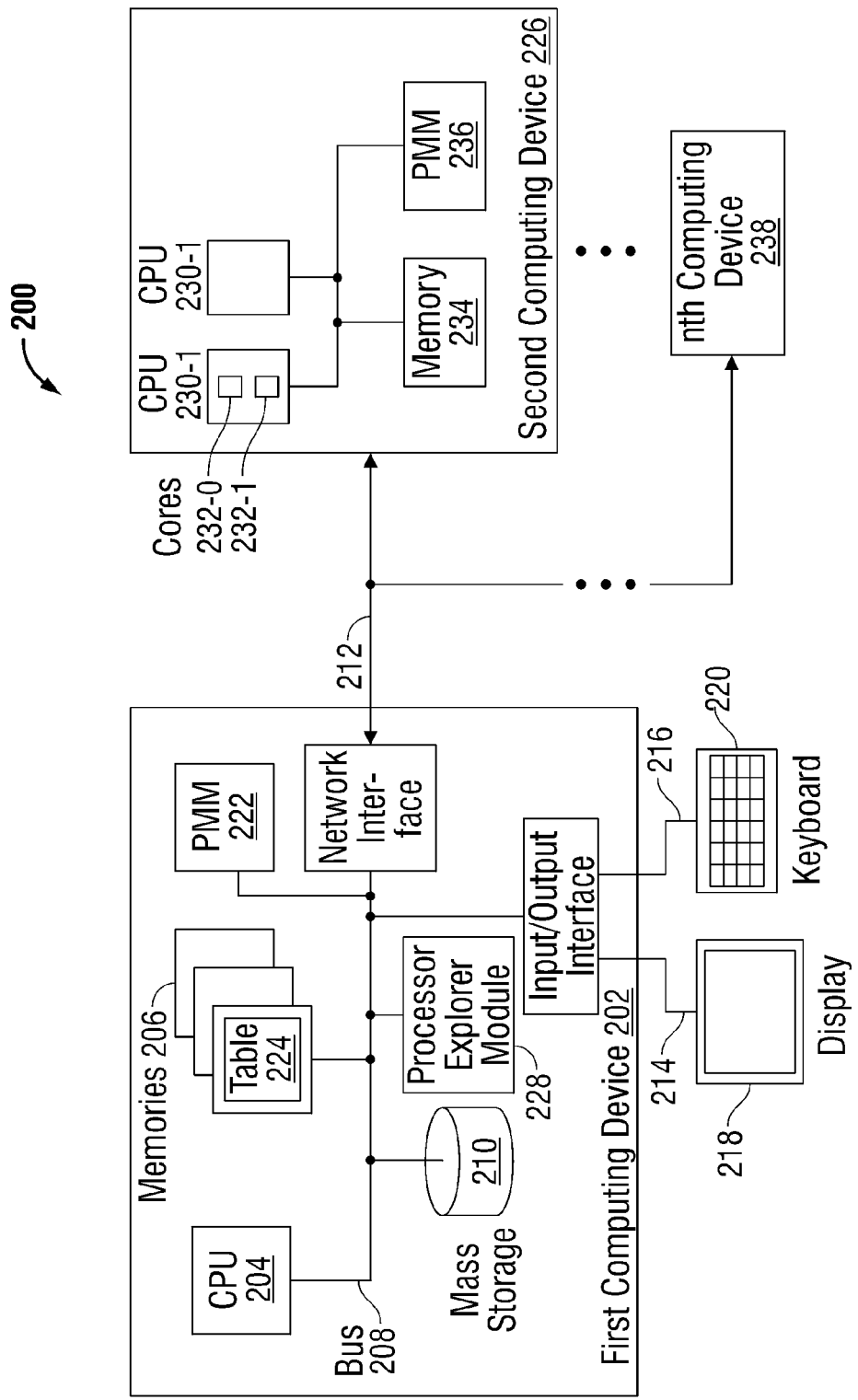
FIG. 2 is a schematic block diagram of a system for in-network power management of network-connected devices.

FIG. 2 is a schematic block diagram of a system for in-network power management of network-connected devices. The system 200 comprises a first computing device 202, which may also be referred to as a personal computer (PC), workstation, or server. An exemplary computer device typically includes a central processing unit (CPU) 204, memories 206, and an interconnect bus 208. The CPU 204 may include a single microprocessor, or may contain a plurality of microprocessors for configuring the computer device as a multi-processor system. Further, each processor may be comprised of a single core or a plurality of cores. The memories 206 may include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 204.

The first computer device 202 may also comprise a mass storage 210 with one or more magnetic disk or tape drives or optical disk drives, for storing data and instructions for use by CPU 204. For a workstation PC, for example, at least one mass storage system 210 in the form of a disk drive or tape drive, stores the operating system and application software. The mass storage 210 may also include one or more drives for various portable media, such as a floppy disk, a compact disc read only memory (CD-ROM), or an integrated circuit non-volatile memory adapter (i.e. PC-MCIA adapter) to input and output data and code to and from the first computer device 202.

The first computer device 202 also includes one or more network interfaces on line 212 for communications, shown by way of example as an interface for data communications via a network. The interface may be a modem, an Ethernet card, or any other appropriate data communications device. The physical communication links may be optical, wired, or wireless.

The first computer device 202 may further include appropriate input/output ports on lines 214 and 216 for user interface interconnection, respectively, with a display 218 and a keyboard 220. For example, the first computer device may include a graphics subsystem to drive the output display. The output display 218 may include a cathode ray tube (CRT) display or liquid crystal display (LCD). Although not shown, the PC type system typically includes a port for connection to a printer. The input control devices for such an implementation may include the keyboard for inputting alphanumeric and other key information. The input control devices on line 216 may further include a cursor control device (not shown), such as a mouse, a touchpad, a trackball, stylus, or cursor direction keys. The links to the peripherals on line 216 may be wired connections or use wireless communications. Although not explicitly shown, the first computing device 202 may further comprise co-processors, associated digital signal processors (DSPs), and associated graphics processing units (GPUs).

The first computer device 202 further comprises a power management module (PMM) 222. Typically, the power management module is a state machine logic hardware device, such as a field programmable gate array (FPGA) or special purpose processor. Alternately, the power management module 222 can be enabled as a sequence of software instructions, stored in memory 210 or 206, and executed by processor 204. As another alternative, the power management module may be partly enabled in hardware and partly enabled in software.

An in-network computing device table 224 is stored in the memory 206 (or mass storage 210). The table 224 comprises a list of network-connected computing devices cross-referenced to computing device processing capabilities. The power management module 222 retrieves processing capabilities from the in-network computing device table 224 for a network-connected second computing device 226, and sends a Wake-on-Local Area Network (LAN) (WOL) message to the second computing device. Subsequently to sending the WOL packet, the power management module 222 sends a server-on-cloud power management message to the second computing device 226, with instructions for enabling capabilities related to processing or memory management.

The second computing device 226 typically includes a processor 230 (two are shown), a memory 234, a network interface on line 212, and its own power management module 236. The second computing device is not limited to any particular number of processors or cores per processor. The second computing device power management module 236 initially receives the WOL message from the network-connected first computing device 202, and subsequently receives the server-on-cloud power management message from the first computing device 202, with instructions. The second computing device 226 enables processing and memory management capabilities in response to the server-on-cloud power management message instructions. Note: although the second computing device 226 is not described in detail, it may be enabled in a manner similar to the first computing device 202. The first and second computer devices may be connected to other computer devices through the network on line 212. An nth computer device 238 is shown in the network. The network is not limited to any particular number of computing devices.

In one aspect, the power management module 222 accesses the in-network computing device table 224 in response to the first computing device receiving a request to perform a task. For example, the task may be input via the user interface on line 216 or from another computing device via the network interface on line 212. The power management module 222 retrieves the second computing device capabilities in response to matching the task to the second computing device capabilities, sends the server-on-cloud power management (SoC-PM) message to the second computing device with instructions for enabling capabilities associated with performing the task. Subsequent to sending the SoC-PM message, the power management module 222 sends the task to the second computing device 226 for performance.

The power management module 222 may sends instructions for enabling processing capabilities related to the number of CPUs, cores per CPU, core operating frequencies, core operating voltages, associated co-processors, associated digital signal processors (DSPs), associated graphics processing units (GPUs), CPU loading, and combinations of the above-mentioned capabilities. The power management module may also send instructions for enabling memory capabilities such as memory type, memory speed, and combinations of the above-mentioned capabilities.

In one aspect, the power management module is embedded at an International Organization for Standardization (ISO) Layer 2 (L2) of the first computing device. As described in greater detail below (see FIG. 3), the power management module 222 sends the server-on-cloud power management message using an Ethernet protocol packet including a unicast media access control (MAC) header with a proprietary Ether type.

In another aspect, the first computing device 202 further includes a processor explorer module 228. The processor explorer module 228 sends a request message to the second computing device 226, and receives a response message from the second computing device including an inventory of second computing device processor hardware. Then, the processor explorer module adds the inventory of second computing device processor hardware to the in-network computing device table 224. The processor explorer module is depicted as hardware, but it may also be enabled, at least partially, in software. Additional details of the processor explorer module 228 can be found in the parent application entitled, SYSTEM AND METHOD FOR INVENTORYING IN-NETWORK PROCESSING CAPABILITY, invented by Waseem Kraipak et al, Ser. No. 12/828,872, filed Jul. 1, 2010, which is incorporated herein by reference.

In one example, the power management module 222 retrieves processing capabilities for the second computing device 226, and determines that the second computing device is comprised of a first plurality of processors (e.g., processors 230-0 and 230-1). Based on this knowledge, the power management module 222 may send the server-on-cloud power management message to the second computing device with instructions for enabling a second plurality of processors (e.g., processor 230-0), where the second plurality is less than, or equal to the first plurality. Likewise, the power management module 222 may determine that the second computing device first processor 230-0 includes a first plurality of cores (e.g., cores 232-0 and 232-1), and sends the server-on-cloud power management message to the second computing device 226 with instructions for enabling a second plurality of first processor cores (e.g., 232-0), where the second plurality is less than, or equal to the first plurality.

More generally, the power management module 222 may determine that the second computing device 226 is comprised of the first processor 230-0 and the second processor 230-1. The power management module 222 selects a first set of properties associated with the first processor, and selects a second set of properties associated with the second processor. The power management module sends a first server-on-cloud power management message with instructions for enabling the first processor with the first set of properties, and subsequently sends a second server-on-cloud power management message with instructions for enabling the second processor with the second set of properties.

In a different aspect, the power management module 222 retrieves processing capabilities for the second computing device, and determines that the second computing device is comprised of an enabled first processor 230-0 and a disabled second processor 230-1. The power management module 222 sends the server-on-cloud power management message to the second computing device 226 with instructions for enabling the second processor 230-1.

In another aspect, the power management module 222 sends the server-on-cloud power management message to the second computing device 226 with instructions for enabling a processing and memory management sleep mode. Alternately, a SoC-PM message may be sent to selectively disable already-enabled processors and memories, or to set enabled processors and memories to lower power settings.

Functional Description

Figure 3:
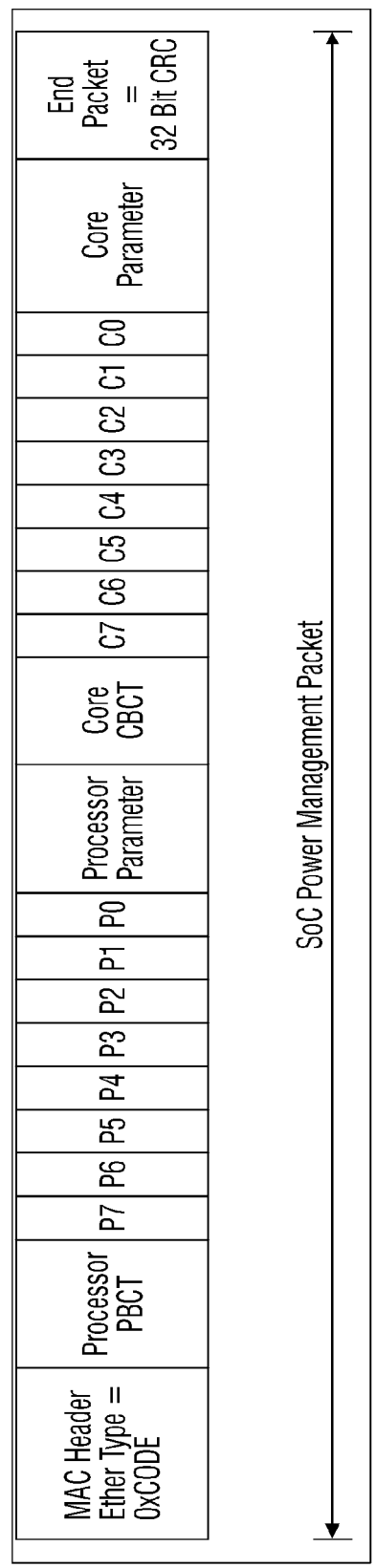
FIG. 3 is a diagram depicting an exemplary SoC-PM message packet definition.

FIG. 3 is a diagram depicting an exemplary SoC-PM message packet definition.

MAC Header: This is a unicast MAC header with the destination address of the computer device being controlled and has the Ether Type=0xCODE (hex) indicating the start of the SoC power management packet.

Processor Broadcast (BCT) bits (PBCT): These are 8 bits indicating a processor broadcast. If these bits are =0xFF, it indicates that all the processors in the device are to be awakened. If these bits are set=0xFE, it indicates that one of the processors is to be awakened and that the processor field is treated as a binary number. When PBCT is 0x00 to 0x20, the processor field is treated as a bit map. Values between 0x20 and 0xFE are unused in this example, but could be used to expand the range of controlled processors beyond 256.

Processor IDs {P7: P0}: These eight bits indicate processor IDs. In this example there are 256 processors in the device that can be uniquely identified and controlled by the packet.

Processor Parameter This is a two-byte field. One byte is dedicated to voltage identification digital (VID) voltage. The second byte is dedicated to the frequency range.

Core Broadcast (CBCT): These 8 bits indicate a core broadcast. If these bits are =0xFF, all the cores in the processor are awakened. If these bits are set=0xFE, only one of the cores needs to be configured or awakened, and the core field is treated as a binary number. When CBCT is 0x00 to 0x20, the core field is treated as a bit map. Values between 0x20 and 0xFE are unused in this example, but could be used to expand the range of controlled cores beyond 256.

Core IDs {P7: P0}: These eight bits indicate core IDs. In this example, up to 256 cores in a processor can be controlled by the packet.

Core Parameter This is a two-byte field. One byte is dedicated to VID Voltage. The second byte is dedicated to frequency range for the cores of the processor.

End packet: This 32-bit cyclic redundancy check (CRC) indicates the end of the packet.

FIG. 4 is a table with the bit definition of the SoC-PM message packet of FIG. 3.

Figure 5:
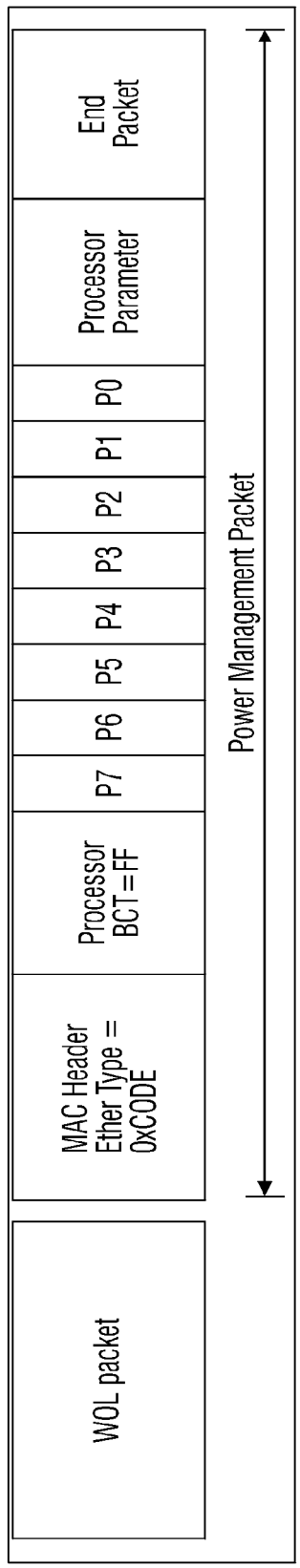
FIG. 5 depicts an exemplary SoC-PM packet, in support of a first usage scenario.

FIG. 5 depicts an exemplary SoC-PM packet, in support of a first usage scenario. In a first scenario, it is assumed that a computing device in sleep/deep sleep mode. The service processor dispatching the job, e.g., the first computing device of FIG. 2, decides to wake up all eight processors inside the device being controlled.

WOL packet: This packet is sent to alert the computing device that a subsequent power management packet is on the way with instructions.

MAC Header: This is a unicast MAC header with the destination address of the device being controlled and has the Ether Type=0xCODE, indicating the start of the power management packet.

Processor Broadcast bits (BCT): These bits indicate that all the processors in the systems have to be woken, since the value is set to 0xFF.

Figure 6:
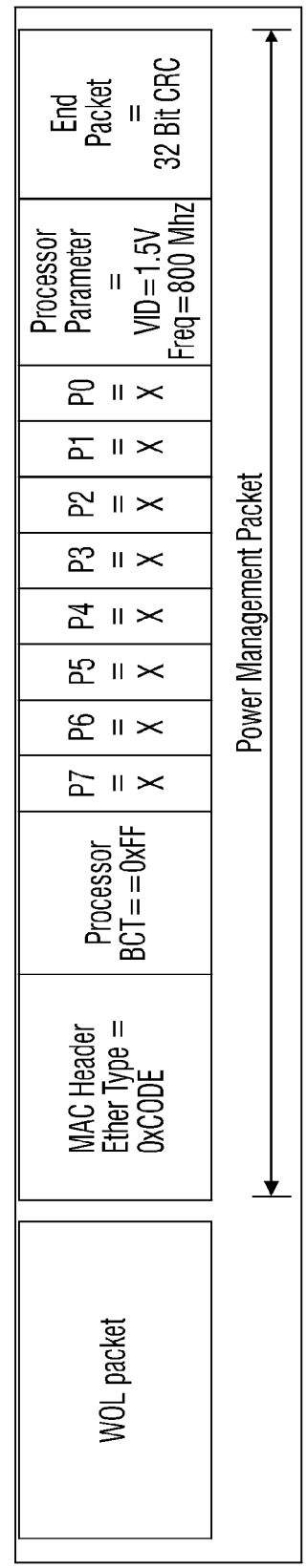
FIG. 6 depicts an exemplary SoC-PM packet, in support of a second usage scenario.

FIG. 6 depicts an exemplary SoC-PM packet, in support of a second usage scenario. In this example the device being controlled has 32 processors on the motherboard. The device is initially in a sleep or deep sleep mode. The user wants to run an application on the device, so the device needs to be awoken. The user decides that this application needs all the 32 processors, with all the processors operating at 800 MHz and a core voltage of 1.5 V.

The WOL packet is used as an alert indicating that the device is to be woken up. The WOL packet is followed by the SoC-PM packet. This packet is a unicast packet destined to the device being controlled. The Ether Type is =0xCODE.

The next byte sent is the processor broadcast byte. In this example it is set to =0xFF (indicating a broadcast message).

The next byte indicates the processor IDs (P7: P0). If the processor broadcast byte is =0xFF, then processor ID byte is ignored.

The next 2 bytes are for processor operating parameters. The first byte is used to select the processor core voltage and second byte selects the processor core frequency. In this example the VID=+1.5V and frequency=800 megahertz (MHz).

The next 4 bytes will be are CRC Bits, indicating the end of packet.

Figure 7:
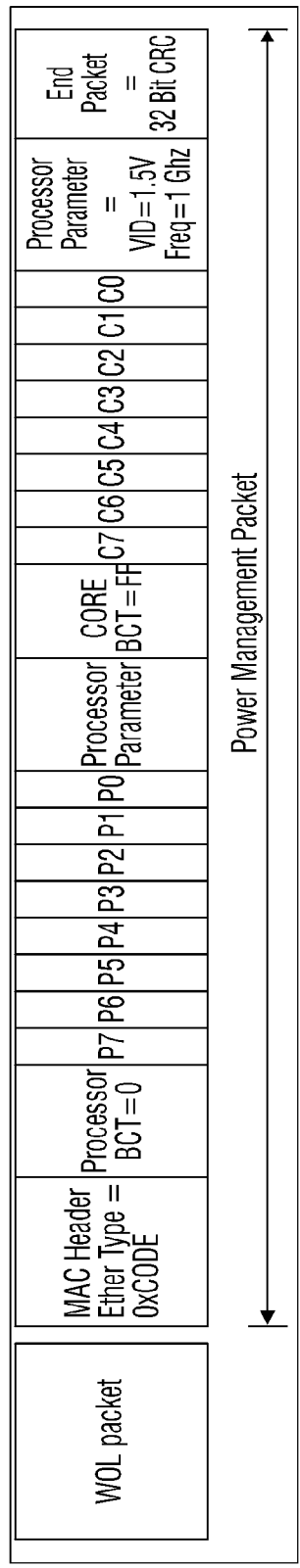
FIG. 7 depicts an exemplary SoC-PM packet, in support of a third usage scenario.

FIG. 7 depicts an exemplary SoC-PM packet, in support of a third usage scenario. In this scenario, the device being controlled is initially in sleep/deep sleep mode. The service processor dispatching the job decides to wake up only one processor and all its cores (e.g., the processor has 32 cores).

WOL packet: This packet signals that a power management packet is on the way and device needs to be awoken according to the instructions in the coming packet.

MAC Header: This is a unicast MAC header with the destination address of the device to be controlled and has the Ether Typ=0xCODE, indicating the start of the power management packet.

Processor Broadcast bits (BCT): The BCT bits are 0x00, so that only one processor is awoken.

Processor IDs {P7: P0}: In this scenario only P0 is set and P1:P7 are zero, indicating only processor ID 0x00 is be awoken.

Processor Parameter: This field is ignored since the processor BCT is 0x00.

CORE BCT: This is the core broadcast bit. Setting these bits to =0xFF indicates that all the cores of the processor are to be awoken. In this example the bits are 0xFF.

Core IDs (C7:C0): These bits are encoded depending the particular core to be woken. In this example, the CORE BCT=0xFF, meaning that all cores are to be awoken. In this example the CORE IDs are "don't care".

Core Parameter: This is a two-byte field. One byte is dedicated to VID Voltage. The second byte is dedicated to the frequency range. In this example, all the cores are awoken at a 1.5 V core voltage and a frequency=1 gigahertz (GHz).

End packet: This is the 32 bit CRC.

Figure 8:
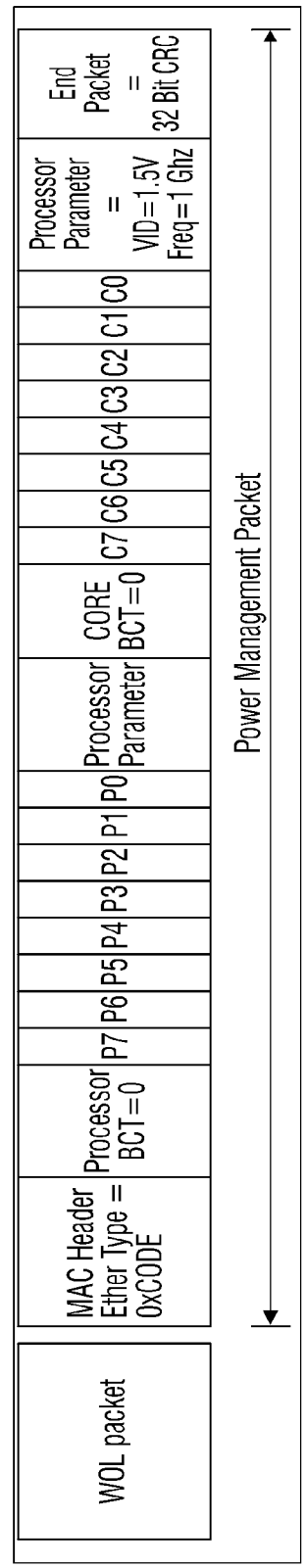
FIG. 8 depicts an exemplary SoC-PM packet, in support of a fourth usage scenario.

FIG. 8 depicts an exemplary SoC-PM packet, in support of a fourth usage scenario. In this scenario the device to be controlled is in sleep/deep sleep mode. The service processor dispatching the job decides to wake up only one processor and one core out of the 32 cores.

WOL packet: This packet indicates that a power management packet is on the way and the device is to be awoken in accordance with instructions in the subsequent packet.

MAC Header: This is a unicast MAC header with the destination address of the device being controlled and has the Ether Type=0xCODE, indicating the start of the power management packet.

Processor Broadcast bits (BCT): The BCT bits are 0x00, selecting only one processor to be awoken.

Processor IDs {P7: P0}: In this example only P0 is set and P1:P7 are zero, indicating that only processor ID 0x0 is woken.

Processor Parameter: This field is ignored since BCT is 0x00.

CORE BCT: This is core broadcast bit. In this example it is 0x00, indicating only one core is woken.

Core IDs (C7:C0): In this example only C0 is set and C1:C7 are zero, indicating that only Core ID 0x00 is woken.

Core Parameter: This is two-byte field. One byte is dedicated to VID Voltage. The second byte is dedicated to frequency range. In this example core zero is awoken at a 1.5 V core voltage and a frequency=1 GHz.

End packet: This is the 32 bit CRC.

Figure 9:
FIG. 9 depicts an exemplary SoC-PM packet, in support of a fifth usage scenario.

FIG. 9 depicts an exemplary SoC-PM packet, in support of a fifth usage scenario. In this scenario the device is already awake. Processor zero is already awake and executing some application. The service processor uses this packet to awaken another processor (P1) in the same device.

MAC Header: This is a unicast MAC header with the destination address of the device being controlled and has the Ether Type=0xCODE, indicating the start of the power management packet.

Processor Broadcast bits (BCT): The BCT bits are 0x00, ensuring that only one processor is awoken according to the processor parameters.

Processor IDs {P7: P0}: In this example only P1=1, P0, P2:P7 are zero, indicating only the processor with the ID of 0x01 is the subject of the instructions.

Processor Parameter This field is ignored since BCT is 0x00.

CORE BCT: This is the core broadcast bit. In this example it is 0x00, indicating that one core needs to be awoken.

Core IDs (C7:C0): In this example only C1 is set and C, C2:C7 are zero, indicating that only the core with the ID of 0x01 is awoken.

Core Parameter: This is a two-byte field. One byte is dedicated to VID Voltage. The second byte is dedicated to frequency range. In this example core1 is woken up at a 1.5 V core voltage and a frequency=1 GHz.

End packet: This is the 32 bit CRC.

Figure 10:
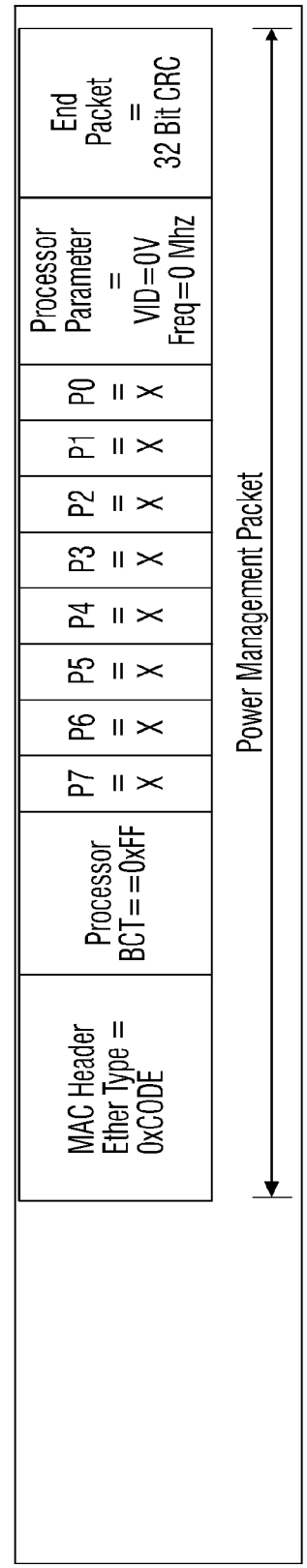
FIG. 10 depicts an exemplary SoC-PM packet, in support of a sixth usage scenario.

FIG. 10 depicts an exemplary SoC-PM packet, in support of a sixth usage scenario. In this scenario the device is already awake. Processors zero and one are already awake and are idle. The service processor sends instructions putting these two processors to sleep.

MAC Header: This is a unicast MAC header with the destination address of the device being controlled and has the Ether Typ=0xCODE, indicating the start of the power management packet.

Processor Broadcast bits (BCT): The BCT bits are 0xFF, indicating an internal broadcast to all processors.

Processor IDs {P7: P0}: The processor ID byte is ignored.

Processor Parameter This field is 0x00, indicating that the voltage and frequency are turned off.

End packet: This is the 32 bit CRC.

Figure 11:
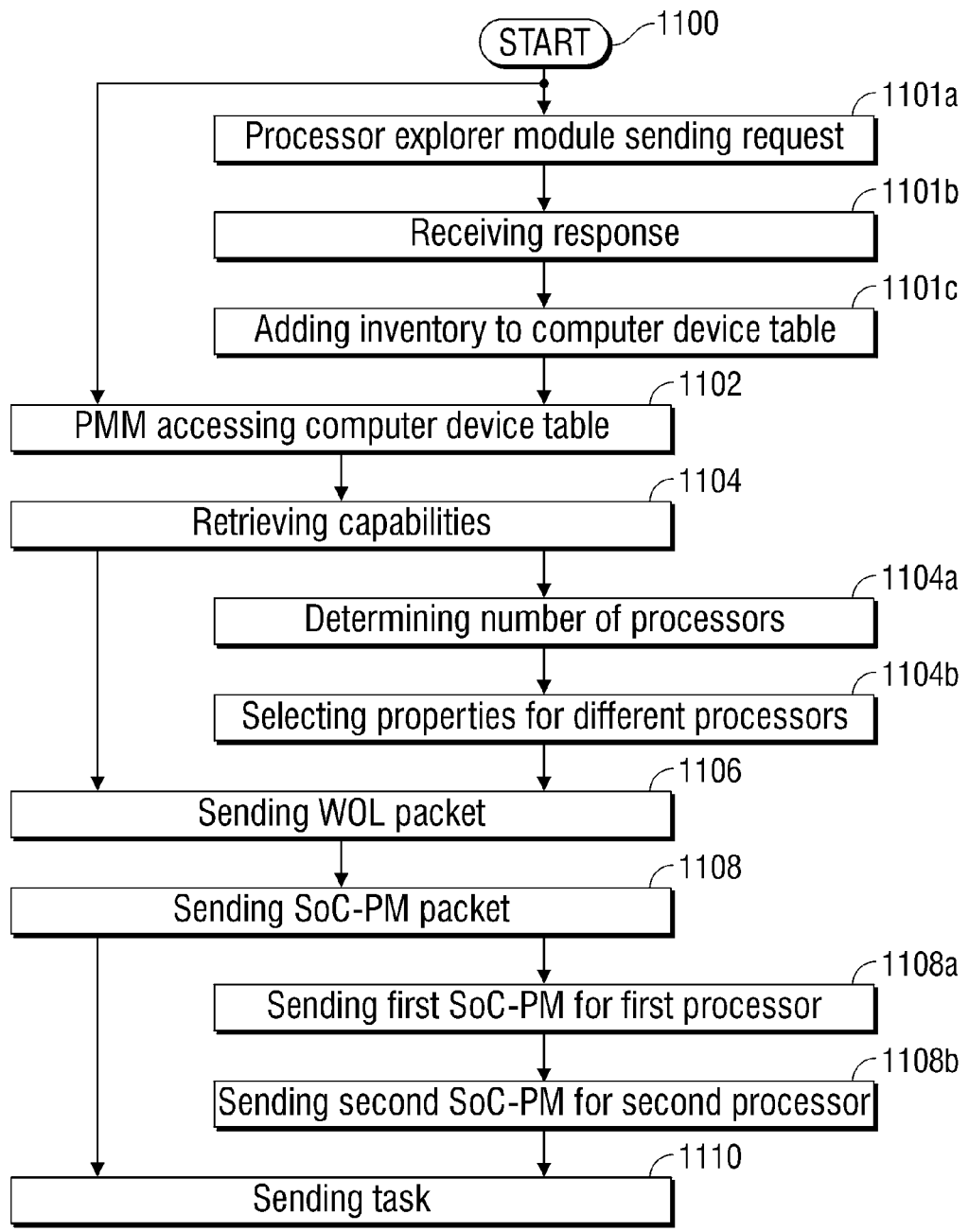
FIG. 11 is a flowchart illustrating a method for in-network power management of network-connected devices.

FIG. 11 is a flowchart illustrating a method for in-network power management of network-connected devices. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1100.

In Step 1102 a first computing device, having a power management module (PMM), accesses an in-network computing device table stored in a local memory, of network-Connected computing devices cross-referenced to computing device processing capabilities. In Step 1104 the power management module retrieves processing capabilities from the in-network computing device table for a network-connected second computing device. In Step 1106 the power management module sends a WOL message to the second computing device. In Step 1108 the power management module sends a server-on-cloud power management message to the second computing device, with instructions for enabling processing and memory management capabilities. In one aspect, Step 1108 includes an ISO L2 power management module sending an Ethernet protocol packet including a unicast MAC header with a proprietary Ether type, as described above in FIGS. 5-10. As noted above, Step 1108 may also be used to send a server-on-cloud power management message to the second computing device with instructions for enabling a processing and memory management sleep mode.

In one aspect, the power management module accessing the in-network computing device table in Step 1102 includes accessing the in-network computing device table in response to the first computing device receiving a request to perform a task, and Step 1104 retrieves second computing device capabilities in response to matching the task to the second computing device capabilities. Sending the server-on-cloud power management message to the second computing device in Step 1108 includes sending instructions for enabling capabilities associated with performing the task. Subsequent to sending the server-on-cloud power management message, in Step 1110 the power management module sends the task to the second computing device for performance.

The server-on-cloud power management message sent to the second computing device in Step 1108 may includes instructions for enabling (or disabling) processing capabilities such as the number of central processing units (CPUs), the number of cores per CPU, core operating frequencies, core operating voltages, associated co-processors, associated DSPs, associated GPUs, CPU loading. CPU loading is the average extent to which the CPU is occupied doing some task. It is measured frequently (every ms or so) with standard algorithms defined per the operating system (OS). The server-on-cloud power management message may also include instructions for enabling (or disabling) memory type and/or the memory speed being used.

In another aspect, prior to the power management module accessing the in-network computing device table in Step 1102, in Step 1101a a processor explorer module of the first computing device sends a request message to the second computing device. In Step 1101b the processor explorer module receives a response message from the second computing device. The response message includes an inventory of second computing device processor hardware. In Step 1101c the processor explorer module adds the inventory of second computing device processor hardware to the in-network computing device table.

In a different aspect, the power management module retrieving processing capabilities for the second computing device in Step 1104 includes the power management module determining that the second computing device is comprised of a first plurality of processors. Then, sending the server-on-cloud power management message in Step 1108 includes sending instructions for enabling a second plurality of processors, where the second plurality is less than, or equal to the first plurality.

In a related aspect, if the power management module determines in Step 1104 that the second computing device is comprised of a first processor with a first plurality of cores, then sending the server-on-cloud power management message in Step 1108 may include sending instructions for enabling a second plurality of first processor cores, where the second plurality is less than or equal to the first plurality. Likewise, if Step 1104 determines that the second computing device is comprised of an enabled first processor and a disabled second processor, Step 1108 may send instructions for enabling the second processor.

Further, Step 1104 may include the following substeps. Step 1104a determines that the second computing device is comprised of a first processor and a second processor. Step 1104b selects a first set of properties for the first processor and a second set of properties for the second processor. Then, sending the server-on-cloud power management message to the second computing device includes the following substeps. Step 1108a sends a first server-on-cloud power management message with instructions for enabling the first processor with the first set of properties. Step 1108b sends a second server-on-cloud power management message with instructions for enabling the second processor with the second set of properties.

Figures 1, 12:
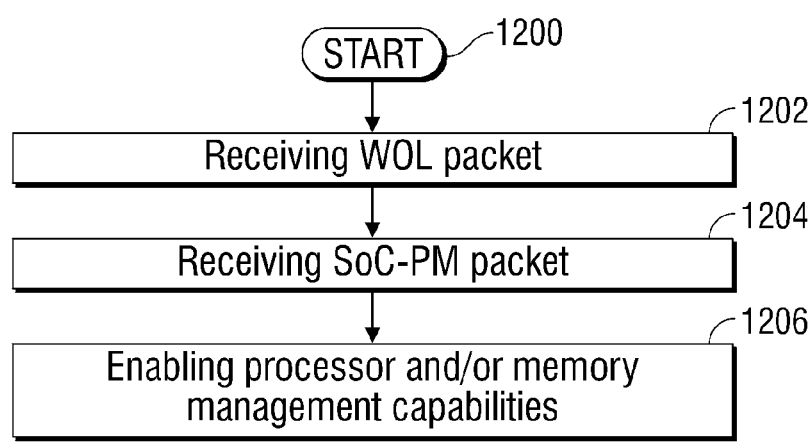
FIG. 1 is a diagram depicting an exemplary WOL packet (prior art).
FIG. 12 is a flowchart illustrating an alternate aspect to the method for in-network power management of network-connected devices.

FIG. 12 is a flowchart illustrating an alternate aspect to the method for in-network power management of network-connected devices. The method starts at Step 1200. In Step 1202 a power management module of a second computing device receives a WOL message from a network-connected first computing device. In Step 1204 the power management module subsequently receives a server-on-cloud power management message from the first computing device, with instructions. In Step 1206 the power management module on the second computing device enables second computing device processing and/or memory management capabilities in response to the server-on-cloud power management message instructions.

A system and method have been provided for the in-network power management of network-connected devices. Examples of particular message structures, processors, and hardware units have been presented to illustrate the invention. However, the invention is not limited to merely these examples. Other variations and embodiments of the invention will occur to those skilled in the art.

We claim:

1. A method, executing on hardware, for in-network power management of network-connected devices, the method comprising:

a first computing, device having a power management module, accessing an in-network computing device table stored in a local memory, of network-connected computing devices cross-referenced to computing device processing capabilities;

the power management nodule retrieving processing capabilities from the in-network computing device table for a network-connected second computing device;

the power management module sending a Wake-on-Local Area Network (LAN) message to the second computing device; and, the power management module sending a server-on-cloud power management message to the second computing device, with instructions for enabling capabilities selected from a group consisting of processing and memory management;

wherein the server-on-cloud power management message comprises a packet which comprises at least;

a media access control header;

a plurality of bits, which indicate a broadcast of the server-on-cloud power management message that relates to each processor of the second network-connected computing device, that are to be awakened by the packet;

a plurality of bits that identify uniquely each processor, of the second network-connected computing device, that are controlled by the packet;

a parameter that relates to a processor voltage identification digital (VID) voltage and a frequency range of each of the processors of the second network-connected computing device;

a plurality of bits, which indicate a broadcast of the server-on-cloud power management message that relates to each core of each processor, of the second network-connected computing device, that are to be awakened by the packet; and, a parameter, which relates to a VID voltage and a frequency range of each core of the processors of the second network-connected computing device.

2. The method of claim 1 wherein the power management module accessing the in-network computing device table includes accessing the in-network computing device table in response to the first computing device receiving a request to perform a task;

wherein the power management module retrieving processing capabilities for the second computing device includes retrieving second computing device capabilities in response to matching the task to the second computing device capabilities;

wherein sending the server-on-cloud power management message to the second computing device includes sending instructions for enabling capabilities associated with performing the task: and the method further comprising:

subsequent to sending the server-on-cloud power management message, the power management module sending the task to the second computing device for performance.

3. The method of claim 1 wherein sending the server-on-cloud power management message to the second computing device includes sending instructions for enabling processing capabilities selected from a group consisting of number of central processing units (CPUs), cores per CPU, core operating frequencies, core operating voltages, associated co-processors, associated digital signal processors (DSPs) associated graphics processing units (GPUs), CPU loading, and combinations of the above-mentioned capabilities.

4. The method of claim 3 wherein sending the server-on-cloud power management message to the second computing device includes, sending instructions for enabling memory capabilities selected from a group consisting of memory type, memory speed, and combinations of the above-mentioned capabilities.

5. The method of claim 1 wherein sending the server-on-cloud power management message to the second computing device includes an International Organization for Standardization (ISO) Layer 2 (L2) power management module sending an Ethernet protocol packet including a unicast media access control (MAC) header with a proprietary Ether type.

6. The method or claim 1 further comprising:

pride to the power management module accessing the in-network computing device table, a processor explorer module of the first computing device sending a request message to the second computing device;

the processor explorer module receiving a response message from the second computing device, the response message including an inventory of second computing device processor hardware; and the processor explorer module adding the inventory of second computing device processor hardware to the in-network computing device table.

7. The method of claim 1 wherein the power management module retrieving processing capabilities for the second computing device includes the power management module determining that the second computing device is comprised of a first plurality of processors; and, wherein the power management module sending the server-on-cloud power management message to the second computing device includes sending instructions for enabling a second plurality of processors, where the second plurality is less than, or equal to the first plurality.

8. The method of claim 1 wherein the power management module retrieving processing capabilities for the second computing device includes the power management module determining that the second computing device is comprised of a first processor with a first plurality of cores; and, wherein the power management module sending the server-on-cloud power management message to the second computing device includes sending instructions for enabling a second plurality of first processor cores, where the second plurality is less than or equal to the first plurality.

9. The method of claim 1 wherein the power management module retrieving processing capabilities for the second computing device includes the power management module determining that the second computing device is comprised of an enabled first processor and a disabled second processor; and, wherein the power management module sending the server-on-cloud power management message to the second computing device includes sending instructions for enabling the second processor.

10. The method of claim 1 wherein the power management module retrieving processing capabilities for the second computing device includes the power management module:

determining that the second computing device is comprised of a first processor and a second processor; and, selecting a first set of properties associated with the first processor and selecting a second set of properties associated with the second processor wherein the power management module sending the server-on-cloud power management message to the second computing device includes:

sending a first server-on-cloud power management message with instructions for enabling the first processor with the first set of properties; and, sending a second server-on-cloud power management message with instructions for enabling the second processor with the second set of properties.

11. The method of claim 1 wherein the power management module sending a server-on-cloud power management message to the second computing device includes sending instructions for enabling a processing and memory management sleep mode.

12. A method executing on hardware, for in-network power management of network-connected devices, the method comprising:
   a power management module of a second computing device receiving a Wake-on-Local Area Network (LAN) message from a network-connected first computing device;
   the power management module subsequently receiving a server-on-cloud power management message from the first computing device, with instructions; and,
   the power management module enabling second computing device capabilities selected from a group consisting of processing and memory management in response to the server-on-cloud power management message instructions;
   wherein the server-on-cloud power management message comprises a packet, which comprises at least:
   a media access control header;
   a plurality of bits, which indicate a broadcast of the server-on-cloud power management message that relates to each processor, of the second network-connected computing device, that are to be awakened by the packet;
   a plurality of bits that identify uniquely each processor, of the second network-connected computing device, that are controlled by the packet;
   a parameter that relates to a processor voltage identification digital (VID) voltage and a frequency range of each of the processors of the second network-connected computing device;
   a plurality of bits, which indicate a broadcast of the server-on-cloud power management message that relates to each core of each processor, of the second network connected computing device, that are to be awakened by the packet; and,
   a parameter, which relates to a VID voltage and a frequency range of each core of the processors of the second network-connected computing device.

13. A system for in-network power management of network-connected devices, the system comprising:
   a first computing device including:
      a processor;
      a memory;
      a network interface;
      a power management module;
      an in-network computing device table, stored in the memory, of network-connected computing devices cross-referenced to computing device processing capabilities; and,
   wherein the power management module retrieves processing capabilities from the in-network computing device table for a network-connected second computing device, sends a Wake-on-Local Area Network (LAN) message to the second computing device, and subsequently sends a server-on-cloud power management message to the second computing device, with instructions for enabling capabilities selected from a group consisting of processing and memory management;
   wherein the server-on-cloud power management message comprises a packet, which comprises at least;
   a media access control header;
   a plurality of bits, which indicate a broadcast of the server-on-cloud power management message that relates to each processor, of the second network-connected computing device, that are to be awakened by the packet;
   a plurality of bits that identify uniquely each processor, of the second network-connected computing device, that are controlled by the packet;
   a parameter that relates to a processor voltage identification digital (VID) voltage and as frequency range of each of the processors of the second network-connected computing device;
   a plurality of bits, which indicate a broadcast of the server-on-cloud power management message that relates to each core of each processor, of the second network-connected computing device, that are to be awakened by the packet; and
   a parameter, which relates to a VID voltage and a frequency range of each core of the processors of the second network-connected computing device.

14. The system of claim 13 wherein the power management module accesses the in-network computing device table in response to the first computing device receiving a request to perform a task, retrieves second computing device capabilities in response to matching the task to the second computing device capabilities, sends the server-on-cloud power management message to the second computing device with instructions for enabling capabilities associated with performing the task, and subsequently sends the task to the second computing device for performance.

15. The system of claim 13 wherein the power management module sends instructions for enabling processing capabilities selected from a group consisting of number of central processing units (CPUs), cores per CPU, core operating frequencies, core operating voltages, associated co-processors, associated digital signal processors (DSPs), associated graphics processing units (CPUs), CPU loading, and combinations of the above-mentioned capabilities.

16. The system of claim 15 wherein the power management module sends instructions for enabling memory capabilities selected from a group consisting of memory type, memory speed, and combinations of the above-mentioned capabilities.

17. The system of claim 13 wherein the power management module is embedded at an International Organization for Standardization (ISO) Layer 2 (L2) of the first computing device, sending the server-on-cloud power management message using an Ethernet protocol packet including a unicast media access control (MAC) header with a proprietary Ether type.

18. The system of claim 13 further comprising:
   a first computing device processor explorer module, the processor explorer module sending a request message to the second computing device, receiving a response message from the second computing device including an inventory of second computing device processor hardware, and adding the inventory of second computing device processor hardware to the in-network computing device table.

19. The system of claim 13 wherein the power management module retrieves processing capabilities for the second computing device, determines that the second computing device is comprised of a first plurality of processors, and sends the server-on-cloud power management message to the second computing device with instructions for enabling a second plurality of processors, where the second plurality is less than, or equal to the first plurality.

20. The system of claim 13 wherein the power management module retrieves processing capabilities for the second computing device, determines that the second computing device is comprised of a first processor with a first plurality of cores, and sends the server-on-cloud power management message to the second computing device with instructions for enabling a second plurality of first processor cores, where the second plurality is less than, or equal to the first plurality.

21. The system of claim 13 wherein the power management module retrieves processing capabilities for the second computing device, determines that the second computing device is comprised of an enabled first processor and a disabled second processor, and sends the server-on-cloud power management message to the second computing device with instructions for enabling the second processor.

22. The system of claim 13 wherein the power management module determines that the second computing device is comprised of a first processor and a second processor, selects a first sot of properties associated with the first processor, selects a second set of properties associated with the second processor, sends a first server-on-cloud power management message with instructions for enabling the first processor with the first set of properties, and sends a second server-on-cloud power management message with instructions for enabling the second processor with the second set of properties.

23. The system of claim 13 wherein the power management module sends the server-on-cloud power management message to the second computing device with instructions for enabling a processing and memory management sleep mode.

24. A system for in-network power Management of network-connected devices, the system comprising:
   a second computing device including:
      a processor;
      a memory;
      a network interface;
      a power management module; and,
   wherein the power management module receives a Wake-on-Local Area Network (LAN) message from a network-connected first computing device, subsequently receives a server-on-cloud power management message from the first computing device, with instructions, and enables second computing device capabilities selected from a group consisting of processing and memory management in response to the serve-on-cloud power management message instructions;
   wherein the server-on-cloud power management message comprises a packet, which comprises at least;
   media access control header;
   a plurality of bits, which indicate a broadcast of the server-on-cloud power management message that relates to each processor, of the second network-connected computing device, that are to be awakened by the packet;
   a plurality of bits that identify uniquely each processor, of the second network-connected computing device, that are controlled by the packet;
   a parameter that relates to a processor voltage identification digital (VID) voltage and a frequency range of each of the processors of the second network-connected computing device;
   a plurality of bits, which indicate a broadcast of the server-on-cloud power management message that relates to each core of each processor, of the second network-connected computing device, that are to be awakened by the packet; and,
   a parameter, which relates to a VID voltage and a frequency range of each core of the processors of the second network-connected computing device.

* * * * *